United States Patent [19]

Lo

[11] Patent Number: 4,875,213
[45] Date of Patent: Oct. 17, 1989

[54] METHOD AND APPARATUS FOR GENERATING COHERENT BOSONS

[75] Inventor: Shui-Yin Lo, Sherman Oaks, Calif.

[73] Assignee: Apricot S.A., Luxembourg, Luxembourg

[21] Appl. No.: 112,842

[22] Filed: Oct. 23, 1987

[51] Int. Cl.$^4$ ............................................. H01S 3/30
[52] U.S. Cl. ........................................ 372/5; 372/70; 372/39
[58] Field of Search ................... 372/73, 5, 34, 35, 39, 372/55, 70, 89

[56] References Cited

U.S. PATENT DOCUMENTS

| | | | |
|---|---|---|---|
| 3,904,985 | 9/1975 | Robinson et al. | 372/59 |
| 4,023,117 | 5/1977 | Schade . | |
| 4,110,703 | 8/1978 | Jalufka et al. | 372/73 |
| 4,205,268 | 5/1980 | Eerkens | 372/5 |
| 4,300,106 | 11/1981 | Hohl | 372/73 |
| 4,414,671 | 11/1983 | Wills, Jr. et al. | 372/73 |
| 4,514,698 | 4/1985 | Blumenthal et al. | 372/73 |
| 4,580,268 | 4/1986 | Barr, Jr. et al. | 372/34 |
| 4,601,040 | 3/1986 | Andrews et al. | 372/34 |

*Primary Examiner*—Léon Scott, Jr.
*Attorney, Agent, or Firm*—Ladas & Parry

[57] ABSTRACT

The method of producing a coherent boson beam causing a coherent light to be incident on dense matter.

38 Claims, 1 Drawing Sheet

METHOD AND APPARATUS FOR GENERATING COHERENT BOSONS

BACKGROUND OF THE INVENTION (i) Field of the Invention

This invention relates to a method and apparatus for forming coherent bosons.

(ii) Prior Art

It is well-known that when intense light from a laser is focused on matter, atoms will absorb energy from photons to become ionized and form a hot plasma. Many works in this field are summarized in the book Plasma and Laser Light, by T. D. Hughes, John Wiley & sons (1976).

It is also known that if the light from a laser is powerful enough, say with an intensity greater than $10^{12}$ watt/cm$^2$, the atoms will be ionized from the light. Furthermore, the electrons coming out from the atoms will absorb more photons. This is referred to in literature as ATO (=Above Threshold Ionization). See for example P. Kruit et al, Phys. Rev A 15, 1604 (1977): and R. R. Freeman et al. Phys. Rev Let 59 1092 (1987).

The following publications relate to laser cooling for producing an ion beam:

"Possibility of Observing a Condensed Crystalline State in Laser-Cooled Beams of Atomic Ions", EUROPHYSICS LETTERS, J. P. Schiffer and O. Poulsen, Europhys. Lett., 1 (2), pp. 55–59 (1986).

"Could There by an Ordered Condensed State in Beams of Fully Stripped Heavy Ions?", J. P. Schiffer and P. Kienle, Z. Phys. A. Atoms and nuclei 321, 181 (1985).

According to this invention there is provided a process whereby if the particles in the matter have a density n sufficiently high as to be larger than a critical density $n_c$.

$$n > n_c \tag{1}$$

then when intense light from a laser shines on them, bosons will be released upon absorption of the photons, and become a beam of coherent bosons. These bosons may be neutral atoms, ionized atoms, molecules, or nuclei. The mechanism is induced scattering, as outlined in International patent application No. PCT/AU86/00212 incorporated by reference.

BRIEF SUMMARY OF THE INVENTION

According to the invention there is provided a method of producing a coherent Boson beam comprising causing coherent light to be incident on dense matter.

BRIEF DESCRIPTION OF THE DRAWING

The invention is further described by way of example only with reference to the accompanying drawing, the single FIGURE of which is a diagram of an apparatus constructed in accordance with the invention.

DETAILED DESCRIPTION

Figure 1:
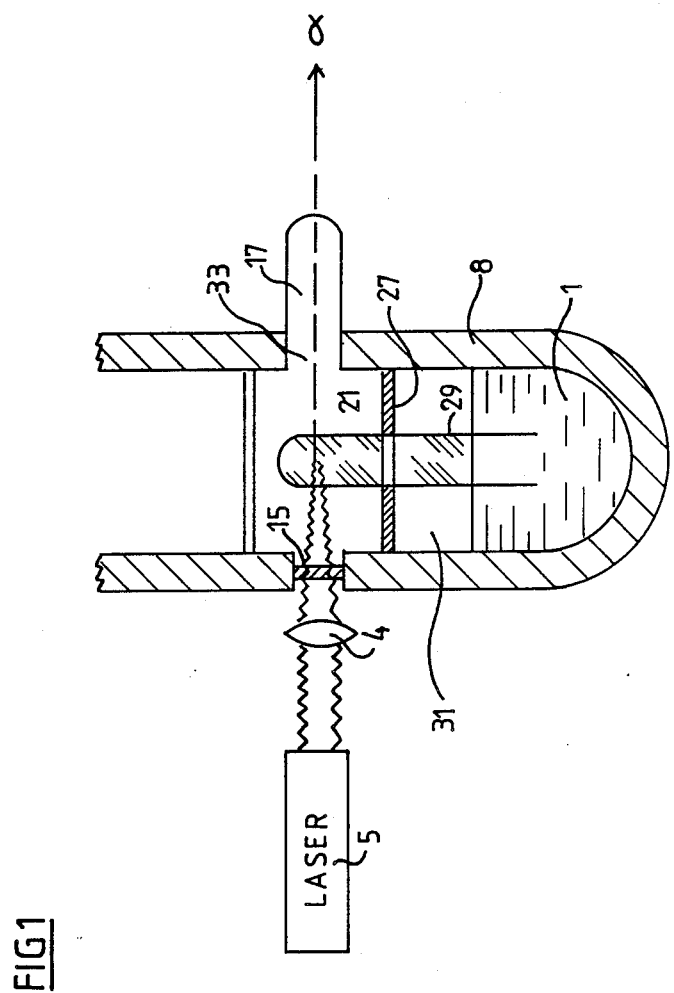

When a system of bosons is under thermal equilibrium, the distribution of their energy obeys Bose-Einstein statistics. If the density of the bosons increases, or the temperature of the bosons decreases, a critical condition is reached and some of the bosons will share the same ground state at the lowest energy and become coherent. This is called Bose-Einstein condensation, and the temperature at which it occurs is the critical temperature. Let the critical density by $n_c$ and the critical temperature $T_c$. We have:

$$n_c = \int \frac{d^3p}{e^{E/kT_c}} \tag{2}$$

where p, E are respectively the momentum and energy of the bosons, $T_c$ is the temperature, and k is the Boltzman constant. Upon evaluation of the integral, they are related by $$n_c = (2mkT_c)^{3/2}\zeta(3/2) \tag{3}$$

where $\zeta(3/2) = 2.612$ is the Riemann function and m is the mass of the charged boson. To evaluate the numerical values, one can assume a temperature of 10° K. and a boson of the order of the mass of the proton, m 1 GeV, and critical density $n_c$ is $10^{24}$/cm$^3$. This is at least an order of magnitude higher than the density of most normal matter. Hence, almost all normal matter never reaches this critical condition at this low temperature. Most matter also becomes solid at 10° K., and its density cannot decrease further. The only way to reach the critical condition (3) is by lowering the temperature even further.

For liquid helium, the critical temperature is reached at $T_c = 2.174°$ K., at normal atmospheric pressure. The corresponding critical density is of the order of $10^{22}$/cm. Once the critical temperature is reached, some of the helium atoms (He$^4$), which are bosons, in the liquid state will become coherent and form a superfluid component in the liquid helium. Focusing an intense light from a laser on the superfluid will cause a coherent boson beam to be formed.

Consider the physical process behind the interaction of light with a helium atom. If there is sufficient intensity of light, the helium atom will absorb many photons to become ionized.

$$n_\gamma \gamma + He \rightarrow \alpha + \bar{e} + \bar{e} \tag{4}$$

Energy requirement dictates that $$n_\gamma \gamma E \geq E_{He} \tag{5}$$

where E is the energy of each individual photon, and $E_{He}$ is the ionization energy of the helium (=27.2 eV). If the energy of the photon in the laser is E=1 eV, it requires at least the absorption of 28 photons by an individual helium atom to become ionized. According to quantum electrodynamics the probability of absorbing each additional photon is down by $\alpha \sim 1/137$ so that the chance of ionization from ordinary light is extremely small. It requires very intense light from a laser to ionize a helium gas. Once the helium is ionized, the absorption of additional photons is generally done by electrons, and the electrons, and the ionized helium atoms will become hot.

However, if the helium atoms are coherent as they are in a superfluid liquid helium state, then there is collective interaction among the coherent photons and coherent helium atoms. Then we may have a coherent neutral helium beam in the final state

$$n_\gamma \gamma + n_0 He \rightarrow n_\gamma \gamma + n_0 He \tag{6}$$

if the energy of photons is not used up for ionization.

On the other hand, the helium may become ionized and separate into a coherent beam of particles and electrons.

$$n_\gamma \gamma + n_o He \rightarrow n_i \alpha + 2n_i(\bar{e}+e) \quad (7)$$

where $n_\gamma$ is the number of coherent photons, $n_o$ is the number of coherent helium atoms, and $n_i$ is the number of coherent $\alpha$-particles ($n_i = n_o$). As discussed in patent application PCT/AU86/00212, in the scattering among coherent particles, there is a factor m! increase in probability whenever there is m coherent bosons. So the probability that (6) and (7) occurs instead of (4) has an additional factor like $(n_\gamma!n_o!n_i!)$. For a 1 Joule light with a pulse of 10 ns from a single mode Nb-YAG laser or an Eximer laser, there are $n_\gamma = 10^{19}$ photons. For superfluid liquid helium, there are about $10^{22}$ helium atoms in 1 cm$^3$. For a liquid film of the size 10 mm $\times$ 10 mm $\times$ 1 mm, there are $n_o \sim 10^{12}$ atoms. So, for the scattering of coherent light with superfluid helium, the probability of producing coherent bosons is practically 1, and the scattering can be regarded as a semiclassical scattering.

Because of momentum conservation, the produced coherent boson beam will tend to travel along the direction of an incident photon beam. If the average number of photons absorbed by helium is large, the final state will contain coherent $\alpha$-particles. For the above example $n = 10^{19}$, $n_o$ $10^{12}$, and $E_\gamma = 1$ eV, the energy of individual $\alpha$-particles in the final coherent beam is given by $(n_\gamma E/n_o) E_\gamma \sim 10^7$ eV.

So, a beam of coherent $\alpha$-particles with energy above MeV is formed. For a 10 MeV $\alpha$-particle, the speed is $2 \times 10^{10}$ cm/sec. The time interval for it to pass through the thickness of the plasma of 1 $\mu$m is $5 \times 10^{-15}$ sec. The power contained in the coherent $\alpha$-beam is:

$$p = \frac{1J}{5 \times 10^{-15}} = 2 \times 10^{14} \text{watt} \quad (8)$$

This is a very substantial concentration of power. Such a powerful beam has many applications including to initiate nuclear fusion in a deuterium pellet under inertia confinement configuration.

The energy of individual coherent bosons produced in the final beam can be adjusted by changing the number of density of the superfluid component of the liquid helium. The higher the temperature, the lower the component of superfluid, and the smaller the energy of the resultant coherent energy beam.

EXAMPLE APPARATUS

The apparatus is illustrated in the drawing as consisting of three major components:

(1) A pulsed laser 5 and its accessories. It may for example be a pulsed Excimer laser like the HE-400-5M or TE-290 series manufactured by Lumonic, 3629 Vista Mercado, Camarillo, CA 93010 USA. Or, it may be a pulsed Nd-YAG laser such as the DCR-3G(1) manufactured by Spectra-Physics, 1250 West Middlefield Road, P.O. Box 7013, Mountain View, CA 94039-7013, USA.

The laser light is focused into a very small spot on a liquid helium film by a lens 4.

(2) Cryostat—A cryostat that can hold liquid helium down to temperature of 1° K. or below. Such a cryostat is described in the book by R. J. Donnelly entitled Experimental Superfluidity published by The University of Chicago Press (1967), and can be ordered from Cryo Industries of America, Inc., 24 Keewaydi Drive, Salem NH 03079, USA. Only the internal part of 8 of the cryostat is shown in the drawing this forming a vacuum chamber 31.

(3) A vacuum chamber 31 inside the cryostat. At the left-handed side in the FIGURE, a window 15 is provided open to allow focussed light from the laser to enter the cryostat. At the right-hand side in the FIGURE, a vacuum transport system 17 is provided leading out of the cyrostat, where the coherent boson beam is extracted. In the middle of the chamber is an inverted U-shaped bent wire 29 within which a liquid helium film 21 is formed by, for example, capillary action from a resevoir 23 of liquid helium in the vacuum chamber 31.

The laser emits pulsed light which enters the cryostat through the window slit and shines on the liquid helium film at 1° K.~2° K. The helium liquid, in this case superfluid helium liquid, will wet the bent wire from a pool of liquid helium in a reservoir 23 below the wire and within the cryostat 8. To avoid heating the liquid helium directly from laser light, it is advisable to provide insulation 27 between the vacuum chamber that holds the liquid helium film and the liquid helium reservoir below. On the other side of the vacuum chamber a port 33 leads to the transport system 17. The laser light falls on the liquid helium film and this gives rise to a coherent $\alpha$-particle beam which exits via port 33.

Besides using liquid helium as a target it is also possible to use other materials at temperature below 2° K. The critical temperature will differ from material to material, calculable from the density of material by equation (4). Such material as deuterium will in general be solid at such low temperature. The deuterium is then in a quantum solid state. Because it is solid and not liquid, it does not become superfluid. But, under scattering from coherent light, the coherent deuterium in a quantum solid state will behave similarly as in the case of superfluid helium and become ionized and form a coherent deuterium beam. It is also possible then to generate other boson beams in similar fashion.

The invention may be used for producing energy by nuclear fusion processes involving directing one or more coherent boson beams to material capable of undergoing nuclear fusion such as deuterium and/or tritium. In this application the beam formed by the invention may, if necessary, be accelerated by use of conventional accelerators before being so directed. The material against which the beam is directed may, for example, be in the form of pellets, as known, and several beams may be directed simultaneously from different directions.

I claim:

1. The method of producing a coherent boson beam having mass, comprising the steps of:
   providing matter comprised of bosons, said matter having a density and temperature such that some of said bosons are at their lowest energy levels; and
   causing coherent light to be incident on said bosons such that a coherent boson beam having mass is produced, said beam having spatial temporal coherence.

2. The method claimed in claim 1 wherein in the step of causing coherent light to be incident on said bosons, said matter has a density greater than a critical density.

3. The method claimed in claim 2 wherein in the step of causing said light to be incident on said bosons, the matter is solid deuterium at low temperature.

4. The method claimed in claim 3 wherein in the step of causing said light to be incident on said bosons, said critical density is of the order of $10^{22}/cm^3$.

5. The method of claim 1 wherein in the step of retaining said dense matter so that some of the bosons are at their lowest energy levels, said some bosons are sharing the same ground state.

6. The method of claim 1 wherein in the step of retaining said dense matter so that some of the bosons are at their lowest energy levels, said some bosons exhibit Bose-Einstein condensation.

7. Apparatus for producing a coherent boson beam having mass, said apparatus comprising:
means for retaining dense matter having a density temperature relationship resulting in some of the bosons within said matter staying at their lowest energy levels;
a laser for producing coherent light; and
means for directing the laser light on said bosons to produce the coherent boson beam having mass.

8. Apparatus as claimed in claim 7 including means for retaining liquid helium for incidence of said coherent light beam thereon.

9. Apparatus as claimed in claim 8 including means for cooling the helium to very low temperatures.

10. The apparatus of claim 7 wherein said means for retaining dense matter results in said some bosons sharing the same ground state.

11. The apparatus of claim 7 wherein said means for retaining dense matter results in said some bosons exhibiting Bose-Einstein condensation.

12. Apparatus for producing a coherent boson beam having mass, said apparatus comprising:
means for retaining dense matter having a density temperature relationship resulting in some of the bosons of said matter staying at their lowest energy levels;
a laser for producing coherent light;
means for directing the laser light on said bosons to produce the coherent boson beam having mass; and
means for directing the coherent boson beam having mass to material which undergoes nuclear fusion when irradiated by said coherent boson beam.

13. The fusion reactor of claim 12 wherein said means for retaining dense matter results in said some bosons sharing the same ground state.

14. The apparatus of claim 12 wherein said means for retaining dense matter results in said some bosons exhibiting Bose-Einstein condensation.

15. A method of generating energy by nuclear fusion comprising: the steps of forming a coherent boson beam by causing coherent light to be incident on dense matter; and directing the beam to material capable of undergoing nuclear fusion.

16. A method of producing a coherent beam of bosons from helium comprising the steps of:
isolating in a controlled environment helium bosons having mass;
creating a density ($n_c$) temperature ($T_c$) relationship amongst said bosons according to the formula $$n_c = \int \frac{d^3p}{e^{E/kT_c}}$$

where
p = momentum
E = energy
k = Boltzman's constant
this formula upon integration thereof yielding $$n_c = (2mkT_c)^{3/2} \zeta(3/2)$$

where
$\zeta(3/2) = 2.612$ which is the Riemann function
m = mass of the boson
such that some of the bosons stay at their lowest energy levels;
focusing an intense coherent light on said bosons staying at their lowest energy levels thereby causing emission of a coherent beam of bosons with mass and temporal and spatial coherence, said coherent beam tending to travel along the direction of the incident intense light beam.

17. The method of claim 16 wherein in the step of creating a temperature density relationship amongst the bosons, the temperature surrounding said system of bosons is decreased until $n_c$ is achieved.

18. The method of claim 17 wherein the boson mass is 1 GeV and $n_c$ is $10^{24}/cm^3$.

19. The method of claim 16 wherein in the step of creating a temperature density relationship amongst the bosons, bosons are added until $n_c$ is achieved.

20. The method of claim 16 wherein the intensity of said light is equivalent to that of a laser beam.

21. The method of claim 16 wherein $n_c$ is the critical density and $T_c$ is the critical temperature.

22. The method of claim 16 wherein in said creating step said some bosons share the same ground state.

23. The method of claim 16 wherein in said creating step said some bosons exhibit Bose-Einstein condensation.

24. The method of claim 16 wherein m = the mass of a charged boson.

25. The method for forming a coherent beam of bosons with mass comprising:
providing matter comprised of bosons having mass some of said bosons staying at their lowest energy states at a given temperature density relationship said matter being located within a cryostat having a window therein;
focusing a laser beam on said matter by shining said beam through said window onto a very small area of said matter, said focusing step providing temporal coherence;
extracting said coherent beam of bosons formed by said interaction of said laser light and said matter from said cryostat, said beam having mass and temporal and spatial coherence.

26. The method of claim 25 further comprising the step placing said matter in a vacuum chamber within said cryostat.

27. The method of claim 26 of further comprising connecting a reservoir of matter containing bosons to the means for providing matter having bosons, said reservoir being insulated from said laser to avoid heating by said laser.

28. The method of claim 26 further comprising the step of pulsing said laser beam on said matter.

29. The method of claim 25 wherein said means for extracting said beam of coherent bosons is a vacuum transport system connected to said cryostat.

30. The method of claim 25, wherein in the step of providing said some bosons share the same ground state.

31. The method of claim 25, wherein in the step of providing, said some bosons exhibit Bose-Einstein condensation.

32. The method of producing by induced scattering a coherent boson beam having mass, said method comprising the steps of:

providing matter comprised of bosons, said matter having a density and temperature such that some of said bosons are at their lowest energy levels;

causing coherent light to be incident on said dense matter whereby by the mechanism of induced scattering, the incident light causes said bosons to be rendered into a coherent state to form said coherent boson beam, said process comprising:

$$A + B \rightarrow A + B$$

wherein A is a first body and B is a second body thereby yielding a two body to two body process without bringing any of the atoms involved therewith into an excited state.

33. The method of producing a coherent boson beam having mass, comprising the steps of:

providing matter having atoms similar to helium atoms, said matter being exposed to temperature and density conditions such that some of the bosons of said matter share the same quantum state and are of a density which is spatially coherent;

shining a coherent beam on said some bosons to provide temporal coherence and thereby to produce coherent boson beam having mass which beam is spatially and temporally coherent.

34. The method claimed in claim 33 wherein in the step of shining, said matter is liquid helium having superfluid properties whereby the boson beam is a beam of alpha-particles.

35. The method claimed in claim 33 wherein in the step of shining, the helium is liquid and there is a critical density of the matter which is of the order of $10^{22}/cm^3$.

36. The method claimed in claim 33 wherein in the step of shining, the matter is liquid helium having superfluid properties whereby the boson beam is a beam of helium.

37. The method of producing a coherent boson beam having mass, comprising the steps of:

providing matter having atoms similar to deuterium atoms, said matter being exposed to temperature and density conditions such that some of the bosons of said matter share close quantum states;

shining a coherent beam on said some bosons to provide temporal coherence and thereby to produce a coherent boson beam having mass which beam is spatially and temporally coherent.

38. The method claimed in claim 37 wherein in the step of shining, the deuterium is solid and the critical density is of the order of $10^{22}/cm^3$.

* * * * *